United States Patent

[11] 3,607,760

[72] Inventor Edna M. McIntyre
 17280 E. 11th, Tulsa, Okla. 74108
[21] Appl. No. 831,700
[22] Filed June 9, 1969
[45] Patented Sept. 21, 1971

[54] CLEANING COMPOSITION FOR PET STAINS
 7 Claims, No Drawings

[52] U.S. Cl........................................................ 252/104,
 252/95, 252/102, 252/186, 252/170, 252/364,
 106/311
[51] Int. Cl......................................................... C11d 7/54
[50] Field of Search............................................. 252/95,
 102, 104, 186, 170, 176, 364; 8/111; 106/311

[56] References Cited
UNITED STATES PATENTS
3,156,654 11/1964 Konecny et al............... 252/95

Primary Examiner—Mayer Weinblatt
Attorney—William S. Dorman

ABSTRACT: A composition for removing pet stains from carpets and the like comprising 10 to 14 parts by weight of butyl cellosolve, 5 to 15 parts of isopropyl alcohol (or ethyl alcohol), about one to three parts of a 3.5 percent solution of hydrogen peroxide, about one-quarter to two parts of ethylene diamine tetracetic acid and 103 parts of water.

CLEANING COMPOSITION FOR PET STAINS

The present invention relates to a composition for removing pet stains from carpets and the like. Whereas this composition may also be used for removing various other types of spots and stains from carpets, upholstery, etc., it is especially designed for use in the removal of pet stains.

There are many cleaning compositions on the market today which are intended for use in the removal of spots and stains from carpets and the like. Some of these compositions are further intended for the removal of specific types of stains. The individual ingredients which make up the composition of the present invention, are individually known per se; also, many of these ingredients are used in cleaning compositions used for different purposes. However, the prior art does not teach the specific combination of ingredients which comprise the novel composition of the present invention; nor does the prior art teach the use of the same or similar composition in connection with the removal of pet stains from carpets and the like.

Therefore, it is a principal object of the present invention to provide a composition for removing pet stains and the like from carpets.

It is a further object of the present invention to provide a composition for removing pet stains from carpets and the like which composition includes butyl cellosolve, isopropyl alcohol (or ethyl alcohol), hydrogen peroxide, ethylene diamine tetraacetic acid (EDTA), and water.

Other and further objects and advantageous features of the present invention will hereinafter appear in connection with the following detailed description of the invention.

EXAMPLE

A cleaning composition was made from the following ingredients in the following parts by weight.

| Ingredients | Parts by Weight |
| --- | --- |
| Butyl Cellosolve (2-Butoxy Ethanol) | 13 |
| Isopropyl Alcohol | 10 |
| Hydrogen Peroxide (3.5% solution) | 2 |
| EDTA (Sodium salt) | 1/2 |
| Water | 103 |

Preferably, the above ingredients are mixed by first mixing the EDTA in the water, thereafter adding the alcohol and cellosolve and finally the hydrogen peroxide solution. After thorough mixing, the composition is ready for use. In the event that any solid particles appear in the mixture, the latter can be simply strained to remove these particles.

When it is desired to remove a pet stain from a carpet or the like, a small quantity of the above composition is sprayed over the stain. The composition is worked into the carpet by agitating or scratching until the stained area is thoroughly wetted. For the average small stain, this should take not more than 1 minute. Thereafter, the wetted area is rubbed dry with a towel. If all of the stain is not removed on the first application, the above steps are repeated. Occasionally, one will run into a pet stain which has been in the carpet for a considerable period of time. For these more difficult stains it is desirable to spray the composition over the stained area, to rub it into the stain and then to cover the stain with diatomaceous earth or similar powder capable of absorbing the liquid composition. After the powder has dried, the latter can be simply lifted away with a vacuum cleaner.

The composition of the present invention can be used for removing all types of pet stains including vomit, urine or feces.

Whereas the first ingredient listed above is butyl cellosolve, it is possible to use other lower aliphatic ethers of ethylene or diethylene glycols such as Carbitol (diethylene glycol ethyl ether) or methyl Carbitol (diethylene glycol methyl ether). Also, the parts by weight are listed as 13 but could range from 10 to 14 in relation to the other ingredients as will be discussed below.

The second ingredient in the above combination is listed as isopropyl alcohol; however, it is possible to substitute lower aliphatic alcohols such as ethyl alcohol. Again, the range of relative parts by weight can vary from five to 15. The third ingredient listed above is hydrogen peroxide, in a 3.5% solution. In the event that a stronger or weaker solution of hydrogen peroxide is employed, the amount of the solution will be varied accordingly; also, the amount of water will be varied accordingly. At the stated strength, however, the amount used can vary between one and three parts.

The fourth ingredient listed above is ethylene diamine tetraacetic acid. The preferred amount employed is one-half part with relation to the other ingredients; however, it is possible to use this ingredient in amounts varying from one-fourth parts to two parts. The preferred source of EDTA is "Versene" (registered trademark) which is manufactured and sold by Dow Chemical Company; the latter product is actually the sodium salt of EDTA. For the purposes of this invention, EDTA and its soluble salts are considered as equivalents.

Whereas the present invention has been described in particular relation to the specific example set forth herein, and the variations relative thereto, it should be understood that other and further modifications may be made within the spirit and scope of this invention.

What is claimed is:

1. A cleaning composition for removing pet stains from carpets consisting essentially of from about 10 to 14 parts by weight of a compound selected from the group consisting of the lower hydrocarbon ethers of ethylene glycol and the lower hydrocarbon ethers of diethylene glycol, from about five to 15 parts by weight of a lower hydrocarbon monohydric alcohol, from about one to three parts by weight of about 3.5% hydrogen peroxide, from about one-fourth to two parts by weight of a compound selected from the group consisting of ethylene diamine tetracetic acid and the water soluble salts thereof, and about 103 parts by weight of water.

2. The cleaning composition set forth in claim 1 wherein the first recited compound is 2-butoxy ethanol.

3. The cleaning composition set forth in claim 1 wherein the first recited compound is diethylene glycol ethyl ether.

4. The cleaning composition set forth in claim 1 wherein the first recited compound is diethylene glycol methyl ether.

5. The cleaning composition set forth in claim 1 wherein the alcohol is isopropyl alcohol.

6. The cleaning composition set forth in claim 1 wherein the alcohol is ethyl alcohol.

7. A cleaning composition for removing pet stains from carpets consisting essentially of about 13 parts by weight of 2-butoxy ethanol, about 10 parts by weight of isopropyl alcohol, about two parts by weight of a 3.5% solution of hydrogen peroxide, about one-fourth part by weight of the sodium salt of ethylene diamine tetraacetic acid, and about 103 parts by weight of water.